April 25, 1950 C. W. NICHOLS 2,505,363
APPARATUS FOR DRYING AND INCINERATING WASTE MATERIALS
Filed Feb. 16, 1944 2 Sheets-Sheet 1
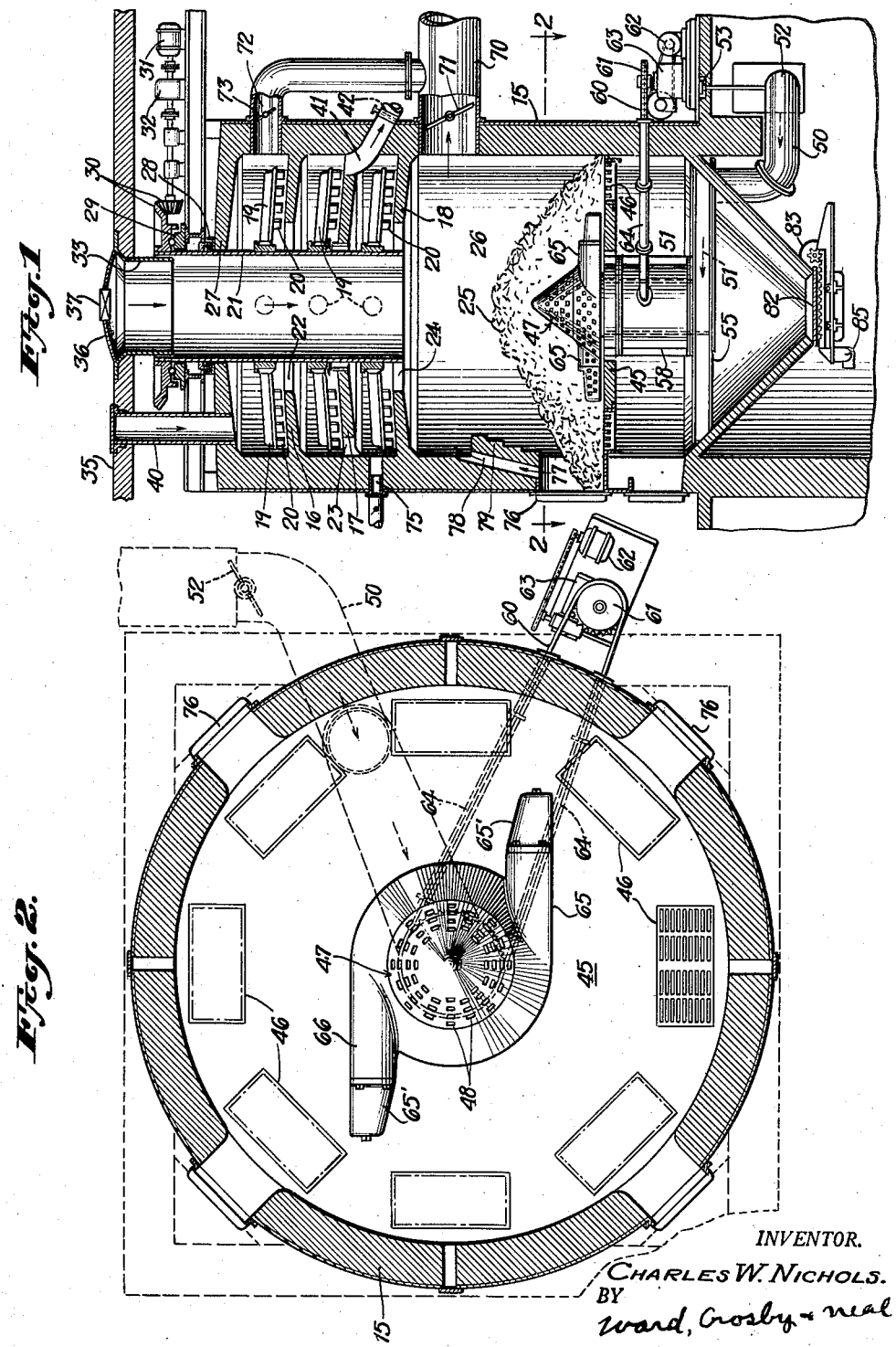
INVENTOR.
CHARLES W. NICHOLS.
BY
Ward, Crosby + Neal
ATTORNEYS.

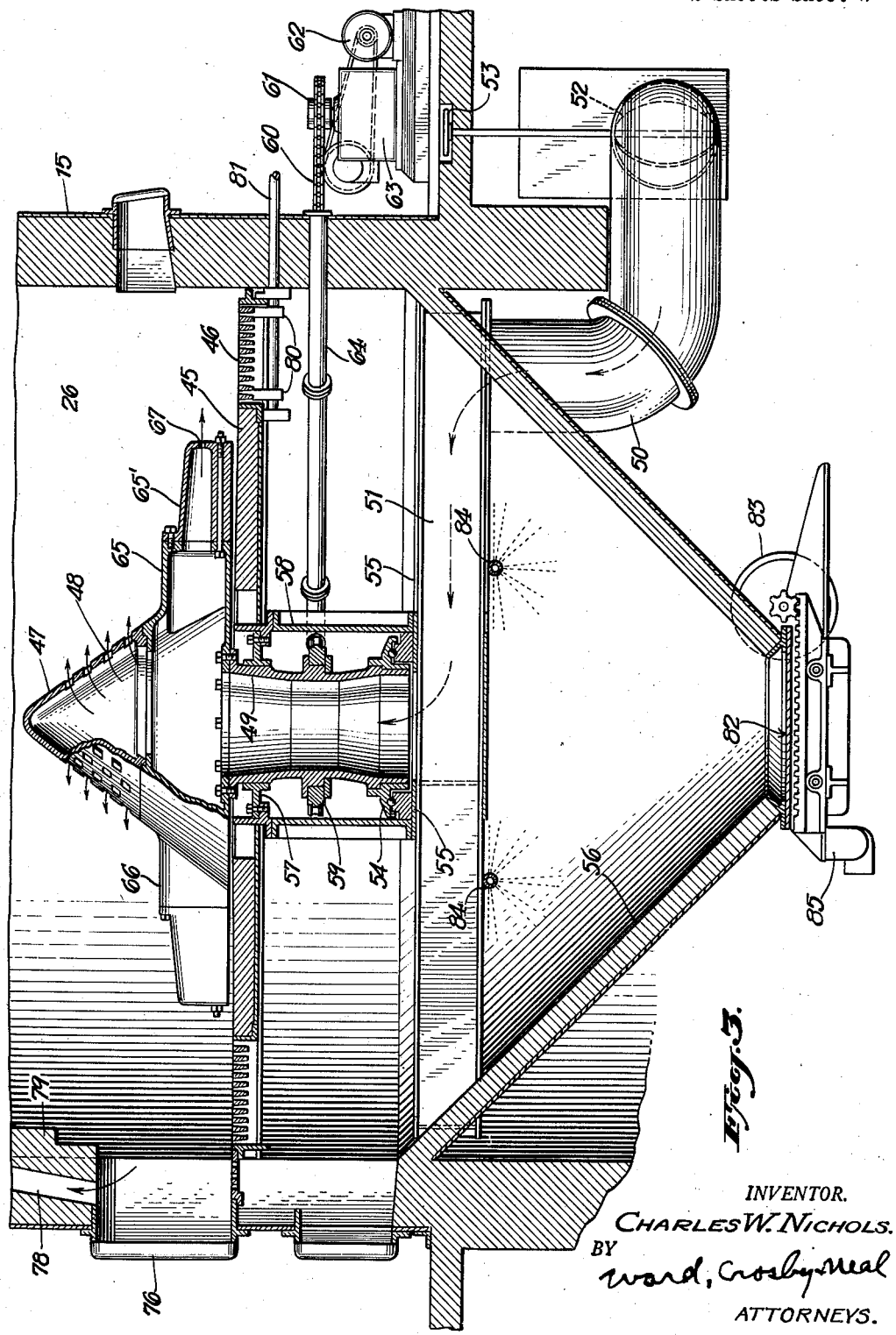

Patented Apr. 25, 1950

2,505,363

UNITED STATES PATENT OFFICE 2,505,363

APPARATUS FOR DRYING AND INCINERATING WASTE MATERIALS

Charles W. Nichols, West Orange, N. J., assignor to Charles W. Nichols, Jr., New York, N. Y.

Application February 16, 1944, Serial No. 522,569

8 Claims. (Cl. 110—15)

This invention relates to apparatus and methods for drying and incinerating waste materials, among other possible uses. The invention is particularly adapted for incineration of municipal trash or refuse and the concurrent drying and/or incineration of dewatered sewage sludge.

In cities of medium or large size, it usually can be determined that the incineration of sludge at a sewage plant and the incineration of refuse such as garbage, at one or more plants conveniently located about the city, is economical. However, with towns of small population the capital investments required for separate sludge and refuse incinerators are as a rule too heavy to be justified, since as is well recognized, the cost per ton of capacity for the equipment does not decrease in proportion to the tonnage. Various attempts have been made to meet this problem in small towns. One proposal has been to grind the available garbage supplies and to then mix same with decanted but unfiltered sewage sludge and feed the resulting mixture from an agitated sump tank into a multiple hearth type sludge incinerator. However, problems are involved in grinding any but the so-called clean green garbage, and consequently combined incineration of garbage and sludge by this method is practically limited to municipalities where rigid separate collection rules are enforced. In many small towns separate collection of garbage and rubbish is not practical and therefore this method is not feasible.

Other attempts have been made to burn sludge filter cake in standard refuse incinerators. This can be done only by using extreme care in feeding and also by using such a small percentage of filter cake that generally there is no advantage in this type of operation. Under average conditions the quantity of sewage sludge filter cake to be disposed of in small towns, amounts by weight to some 30 or 40% of the amount of mixed refuse available, yet generally no more than about 10% of sludge can be satisfactorily burned in the refuse incinerators.

The difficulties of combined incineration of sewage sludge and refuse are increased due to formation of obnoxious odors in case any parts of the mass are only heated to relatively low temperatures or are allowed to smolder.

Thus, except possibly under special limited conditions, all past attempts to deal with the problem of combined incineration of sewage sludge and refuse such as garbage and trash, have been unsuccessful or uneconomical.

The patent to Baird et al., No. 2,015,050, granted September 17, 1935, discloses a multiple hearth furnace apparatus and methods which have gone into wide and successful use for the drying and incineration of dewatered or filtered sewage sludge. The patent to C. W. Nichols, No. 2,232,556, granted February 18, 1941, discloses on the other hand, apparatus which has gone into successful use for the incineration of refuse such as garbage, rubbish and trash. The present invention involves a novel combination of various features of these two patents in such a way as to afford a very economical solution of the difficulties in the problem above discussed. According to the invention, the sewage sludge is first dried in a multiple superposed hearth furnace portion similar in some respects to the construction of the upper part of the furnace in said Baird et al. patent. Meanwhile, the refuse such as trash, garbage and the like, is supplied to a burning pile below such hearths, such pile being agitated and supplied with air by apparatus such as disclosed in said Nichols patent. The dried sludge as it leaves the drying hearths, is scattered in finely divided condition over the top of the burning refuse pile. According to a preferred example of the invention, the refuse is fed to such pile through a central conduit which also forms a part of the rabbling structure as used in conjunction with the drying hearths. Such conduit may be protected internally and externally by suitable insulation material if desired.

Various further and more specific objects, features and advantages of the invention will clearly appear from the detailed description given below taken in connection with the accompanying drawings which form a part of this specification and illustrate by way of example a preferred form of apparatus for practising the invention. The invention consists in such novel features and combinations as may be shown and described in connection with the apparatus herein disclosed, and also such novel methods as are disclosed herein.

In the drawings, Fig. 1 is a vertical sectional view of a preferred form of furnace apparatus embodying the invention;

Fig. 2 is a horizontal sectional view taken substantially along line 2—2 of Fig. 1; and Fig. 3 is an enlarged vertical sectional view of the lower portion of the furnace of Fig. 1.

As shown in Fig. 1, the furnace may comprise a cylindrical outer wall 15 supporting within its upper portion a plurality of superposed sludge drying hearths, three of such hearths being here indicated at 16, 17 and 18. A larger or lesser number of such hearths may be provided if desired or necessary. These hearths which are preferably located quite close together, are accompanied by rabbling means comprising rabble arms as at 19 having teeth as at 20 for rabbling, agitating, breaking up and advancing the drying material inwardly and outwardly respectively over alternate hearths. That is, the rabble arms 19 are carried by a rotatable central shaft structure as at 21, and at the upper hearth 16 for example, the rabble teeth 20 are directed at an angle to advance the sludge material inwardly of this hearth, so that it falls through a central discharge port as at 22 on to hearth 17. At the latter hearth the rabble teeth are directed at angles to advance the sludge outwardly to fall through peripheral discharge openings as at 23 on to hearth 18. On hearth 18 as in the case of hearth 16 the material is advanced inwardly to fall through a central discharge port 24, the dried material thereby being scattered on to a burning pile of refuse as at 25 within a refuse incinerating chamber 26. Four of the rabble arms 19, for example, may be provided at each hearth, and in some cases if desired, some of the rabble teeth may be positioned at an angle to "back rabble" the material to prolong its treatment on certain of the hearth areas.

The rotatable shaft 21 as shown is made hollow and is preferably of a diameter considerably larger than the central shaft of the usual multiple hearth furnace, in order that the shaft interior may comprise a charging throat or inlet through which refuse may be charged onto the mid portion of the burning pile 25. At the region where the rotatable shaft 21 passes through the top wall 27 of the furnace, sealing means of a suitable known type as indicated at 28, may be provided to contain suitable luting material to withstand the temperatures present. The shaft may be rotatably supported on a large annular bearing, as indicated at 29 above the top of the furnace. This bearing may be accompanied by gearing as at 30 driven as by motor 31 connected through a suitable reduction gear 32.

The refuse may be introduced into the hollow interior of shaft 21 through a cylindrical stationary hollow member 33 extending down through a charging floor as at 35. The lower edges of the member 33 as shown may be telescoped in close fitting arrangement with the upper edges of the rotatable shaft 31. At times when charges of refuse are not being introduced, the opening into the top of member 33 may be covered by a removable plate 36 having if desired an adjustable damper 37 permitting a regulated amount of air to be drawn down into the shaft to prevent overheating thereof.

The dewatered sewage sludge may be introduced from suitable belt conveyor means or from the charging floor 35 through an inlet 40, to fall on the upper drying hearth. The sludge as thus introduced may comprise filter cake as obtained from the treatment of the sludge with vacuum filters. However, it is not essential that the sludge be in the form of filter cake, as in small towns, sewage drying beds are widely used, which require less capital cost. Drying bed sludge may be handled in this equipment as easily and economically as filter cake.

If desired, means may be provided at one or more of the hearth discharge ports for discharging dried or partially dried sludge from the furnace without incineration. Such a means is shown in Fig. 1 in the form of a conduit 41 connected at one of the discharge ports in hearth 17. This conduit may be closed off when desired by a gate 42. Thus in towns where it may be desired to merely dry a considerable portion of the sludge for use as fertilizer, this may be readily accomplished with the equipment, and the amount of sludge which is withdrawn without burning may be readily varied from time to time, depending upon local requirements.

As to such constructional features of the sludge drying portion of the furnace as are not herein specifically described, reference may be had to the above mentioned Baird et al. patent.

The lower portion of the furnace as shown in the lower part of Fig. 1 and in Figs. 2 and 3 may, if desired, be constructed in general accordance with the disclosure of the above mentioned Nichols patent. However, various improvements are included in the particular form of construction here shown.

The bottom of the chamber 26 may comprise a central stationary refractory hearth area 45 surrounded by an annular grate area 46 or by a plurality of separate grate sections arranged around the hearth 45. At the mid portion of the fixed hearth area 45, a rotatable upstanding hollow member of generally conical shape is provided as shown at 47.

As shown in Fig. 3, the cone member 47, either at the upper portion thereof or preferably throughout its surfaces, may be provided with air discharge apertures as at 48, the hollow interior of the cone communicating through a hollow supporting shaft 49 with an air supply furnished from a suitable source connected for example through conduits 50 and 51. The air thus supplied may if desired be preheated in any suitable way and the amount may be adjusted as by a damper 52 controlled as by a rotatable handle 53 located at a convenient position for operation.

The weight of the rotatable cone structure may be carried by a suitable annular frictionless bearing as at 54 mounted at the base of the shaft 49 upon a beam structure as at 55 extending across the upper part of an ash pit 56. The upper portion of the shaft 49 may be retained in position by an annular bearing 57 carried by a suitable cylindrical housing and supporting structure as at 58, which also supports the mid portion of the fixed hearth area 45. The cone structure may preferably be rotated by a sprocket and chain arrangement including for example a sprocket 59 carried by the shaft 49 and engaged by a chain 60 driven by a sprocket 61. Sprocket 61 may be driven as by a motor 62 connected through suitable reduction gearing 63. The chain 60 as shown may pass through conduit means as at 64 extending from the exterior of the furnace to the interior of the structure 58 and thereby housing and protecting the chain from dust, ashes, etc. The bearings for shaft 49, and the sprocket 59 are similarly protected by the housing 58.

The drive means for rotating the cone structure 47 may for example be arranged to rotate this structure once every 15 to 20 minutes. On the other hand, the rabbling structure at hearths 16—18 should ordinarily be rotated at a faster rate, for example, one or two revolutions per minute.

The above described sprocket and chain driving arrangement is particularly advantageous in cases where a rigid foundation is unavailable for the support of the rotatable cone structure of its motor drive means, or where it would be too difficult or expensive to keep these two parts of the equipment accurately in fixed relative positions, as would be required for efficient gear drive means.

The cone structure 47 may be provided if desired with two or more generally tangential scraper arms as at 65, 66. These arms may have detachable and replaceable hollow end portions as at 65' formed with air discharge apertures as at 67.

The cone structure and accompanying tangential arms as rotated will serve to agitate the pile of refuse 25 and mix the same with any desired amount of sewage sludge as scattered thereover, while at the same time gradually advancing the material from the periphery of the pile as it becomes well ignited or burned, over the peripheral grate areas 46, air for affording efficient combustion at the same time being introduced to the burning material through ports as at 48 and 67 as well as through grates 47. Since with this arrangement combustion of the refuse is unusually thorough, uniform, efficient and prompt, a large proportion of sewage sludge may be at the same time scattered over the refuse pile and mixed therewith to be efficiently burned without danger of smothering the fire.

The hot gaseous products of combustion arising in the chamber 26 may in part be withdrawn as shown in Fig. 1, through a conduit 70 connected for example to a stack, and provided with a regulating damper 71. Other portions of these hot gases may be drawn up through the discharge ports of hearths 16—18 and over these hearths in succession, to a supplemental discharge conduit 72 connected into the conduit 70 and also provided with a damper 73. Thus, a regulated amount of hot gases may be passed over the several hearths for effectively drying the sludge thereon as same is being rabbled.

It is not intended to ordinarily dry and heat the sludge on the hearths 16—18 to a point where combustion will occur, as it is only necessary on these hearths to process the sludge to a fairly dried and finely divided condition ready for scattering from discharge port 24 on to the burning refuse pile.

The multiple hearth drying arrangement is particularly advantageous for treating the sludge before it is applied to the burning refuse pile, inasmuch as the rabbling and drying action is such as to bring the sludge into finely divided dry condition which is essential for thorough burning. Also the scattering action from hearth port 24 is highly desirable as it insures uniform feeding on to the burning refuse pile. If for example the sludge were placed on the pile 25 in the form of relatively moist pieces of filter cake or other lumps, or large masses, same would tend to become case-hardened and the moist interiors of the lumps would be difficult or impossible to burn in conjunction with the burning refuse.

Since ignition of the sludge is not contemplated on the hearths 16—18, the use of cooling conduits for the rabble arms for the protection of same is not essential, although such cooling may if desired be provided by known means. If desired, to insure against overheating of the lower hearths as at 17 and 18, air may be introduced from the exterior of the furnace through conduits as at 75 and having adjustable dampers.

The chamber 26 may be provided with a plurality of doors as at 76, permitting inspection of the conditions within the various parts of the chamber and also through which manual stoking of the pile of refuse and cleaning of the grates may be accomplished if desired at times. These doors as shown may be located with their lower edges at the same level as the grate areas 46. Consequently at times, portions of the pile of refuse 25 may extend into the wall cavities at the doors 76 and form air pockets as at 77 (Fig. 1) in which smoke may tend to accumulate. The air as discharged from the cone structure may tend to force considerable volumes of smoke into the pockets 77, causing same to escape around the doors 76 into the furnace room unless means is provided to prevent this. In the structure shown this difficulty is prevented by providing as shown in Fig. 1 a smoke flue as at 78 communicating with the pockets 77 at each of the doors and passing upwardly and inwardly of the furnace wall to discharge the smoke into the upper part of the chamber 26, above the pile of burning refuse. As shown in Fig. 1, the furnace wall inwardly of the smoke flue 78 may be strengthened by inwardly stepping the brickwork with arched constructions if desired, as shown at 79.

If desired, the grate areas 46 may be of a type adapted to be dumped by mechanism of suitable known type indicated at 80 and operable from the exterior of the furnace by shafts as at 81 (Fig. 3). The bottom of the ash pit 56 may be provided with a suitable known type of ash gate as at 82 operable as by a chain wheel 83. When the ash gate is opened, water may be supplied as from sprinklers 84 in the ash pit for washing the ash down to a drain 85.

The above described furnace arrangement is adapted for various uses other than the treatment of waste material. For example, various forms of ore may be dried and rabbled into finely divided condition on the upper hearths and then scattered over a pile of burning fuel or other material in the chamber 26 for further roasting treatment with possible recovery of useful gases through the conduit 70.

The provision of the charging opening for the chamber 26 in the form of a large hollow rotatable shaft of the multiple hearth rabbling structure, provides a convenient, inexpensive and durable means for facilitating charging the material or rubbish directly on to the central areas of the burning pile 25 without the necessity of using any charging mechanism or means protruding into the sides of the chamber 26 where any such means would be subject to rapid deterioration because of the high temperatures present, and might also interfere with the symmetrical formation of the burning pile. For these and other reasons it will be observed that a highly efficient combination of two types of incineration units is made possible and the capital expenditures necessary for the combined unit, as well as the operating and maintenance costs thereof, will be substantially less than if the two types of units are constructed for separate operation.

While the invention has been described in detail with respect to a certain preferred example, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. A furnace construction comprising a plurality of superposed hearths, means defining a chamber within the furnace below said hearths and adapted to contain a pile of burning material, a central vertical rotatable shaft carrying rabbling means for agitating and advancing material over each of said hearths in succession, and then into said chamber, each of said hearths being formed with discharge ports through which the material falls therefrom, said shaft being hollow and positioned with its lower end communicating with the upper portion of said chamber, and with its upper end accessible from above the furnace, whereby material may be charged onto such pile through said shaft, and supplementing material from said hearths.

2. Incinerating apparatus comprising means defining a furnace chamber, a central floor area of said chamber comprising a stationary hearth, a grate area surrounding said hearth, means rotatable about a generally vertical axis through the mid portion of said hearth for agitating material on said hearth and for gradually advancing such material outwardly onto said grate area, a rotatable generally vertical hollow shaft opening into the upper part of said chamber for introducing some of such material, one or more generally horizontal hearths surrounding said shaft, the top of the furnace being formed with another opening for admitting other portions of such material onto said hearth or hearths, and rabbling means carried by said shaft for agitating and advancing the latter material over said latter hearth or hearths and therefrom into said chamber at points adjacent said shaft, said hearth or hearths being formed with discharge ports through which the material falls therefrom.

3. Incinerating apparatus comprising means defining a furnace chamber, a central floor area of said chamber comprising a stationary hearth, a grate area surrounding said hearth, means rotatable about a generally vertical axis through the mid portion of said hearth for agitating material on said hearth and for gradually advancing such material outwardly onto said grate area, a rotatable generally vertical hollow shaft opening into the upper part of said chamber for introducing some of such material, one or more generally horizontal hearths surrounding said shaft, the top of the furnace being formed with another opening for admitting other portions of such material onto said hearth or hearths, rabbling means carried by said shaft for agitating and advancing the latter material over said latter hearth or hearths and therefrom into said chamber at points adjacent said shaft, said hearth or hearths being formed with discharge ports through which the material falls therefrom, means for driving said rotatable means in the chamber at a relatively slow speed, and means for rotating said shaft and the rabbling means carried thereby more rapidly.

4. Incinerating apparatus comprising means defining a furnace chamber providing a space of substantial height adapted to receive a pile of burning trash, garbage and the like, means at the mid portion of the bottom of said chamber and constructed and arranged to be generally covered by such pile, for agitating such pile and introducing supplies of air into the mass, a plurality of hearths above said chamber adapted for the drying of sewage sludge, rabbling means for agitating, breaking up and advancing the sludge over said hearths and for causing the resulting dried sludge to be scattered from the lowermost hearth onto such pile, said hearths being formed with discharge ports through which the sludge falls therefrom, and the structure being formed with separate inlets respectively for admitting the material to said chamber and to the upper hearth.

5. Incinerating apparatus comprising means defining a furnace chamber providing a space of substantial height adapted to receive a pile of burning trash, garbage and the like, means at the mid portion of the bottom of said chamber and constructed and arranged to be generally covered by such pile, for agitating such pile and introducing supplies of air into the mass, a plurality of hearths above said chamber adapted for the drying of sewage sludge, rabbling means for agitating, breaking up and advancing the sludge over said hearths and for causing the resulting dried sludge to be scattered from the lowermost hearth onto such pile, said hearths being formed with discharge ports through which the sludge falls therefrom, and the structure being formed with separate inlets respectively for admitting the material to said chamber and to the upper hearth, and means for withdrawing an adjustable proportion of the hot gaseous products of combustion from the pile, over said hearths for furnishing drying heat therefor.

6. Incinerating apparatus comprising means defining a furnace chamber adapted to receive a pile of burning trash, garbage and the like, means for agitating such pile and introducing supplies of air into the mass, a plurality of hearths above said chamber adapted for the drying of sewage sludge, and rabbling means for agitating, breaking up and advancing the sludge over said hearths and for causing the resulting dried sludge to be scattered from the lowermost hearth onto such pile, said hearths being formed with discharge ports through which the material falls therefrom, said rabbling means including a central generally vertical rotatable hollow shaft communicating with said chamber to form an inlet through which waste material to replenish said pile may be introduced.

7. A furnace construction comprising a hearth, means defining a chamber within the furnace providing a space of substantial height below said hearth and adapted to contain a pile of burning material, a central vertical rotatable shaft carrying rabbling means for agitating and advancing material over said hearth and then into said chamber, said hearth being formed with a discharge port or ports through which the material falls therefrom, said shaft being hollow and positioned with its lower end communicating with the upper portion of said chamber, and with its upper end accessible from above the furnace, whereby material may be charged onto such pile through said shaft, and supplementing material from said hearth.

8. Incinerating apparatus comprising means defining a furnace chamber providing a space of substantial height adapted to receive a pile of burning trash, garbage and the like, means at the mid portion of the bottom of said chamber and constructed and arranged to be generally covered by such pile for agitating such pile and introducing supplies of air into the mass, a hearth above said chamber adapted for the drying of sewage sludge, rabbling means driven independently of the above-mentioned agitating means, for agitating, breaking up and advancing sludge over said hearth and for causing the resulting dried sludge to be scattered from such hearth onto such pile, said hearth being formed with a discharge port or ports through which the sludge falls therefrom, and the structure being formed with separate inlets respectively for admitting the material to said chamber and to said hearth.

CHARLES W. NICHOLS.

REFERENCES CITED

The following references are of record in the file of this patent:

UNITED STATES PATENTS

| Number | Name | Date |
|---|---|---|
| 524,688 | Ransome | Aug. 14, 1894 |
| 551,342 | Wentworth | Dec. 10, 1895 |
| 708,946 | Welch | Sept. 9, 1902 |
| 976,175 | Herreshof | Nov. 22, 1910 |
| 1,139,658 | Fitzgerald | May 18, 1915 |
| 1,208,246 | Wedge | Dec. 12, 1916 |
| 1,245,914 | Helseth | Nov. 6, 1917 |
| 1,724,352 | Ilving | Aug. 13, 1929 |
| 1,860,841 | McEver | May 31, 1932 |
| 2,015,050 | Baird | Sept. 17, 1935 |
| 2,015,051 | Baird | Sept. 17, 1935 |
| 2,115,337 | Lewers | Apr. 26, 1938 |
| 2,125,720 | Hartley | Aug. 2, 1938 |
| 2,183,463 | Moreton | Dec. 12, 1939 |
| 2,223,117 | Miller | Nov. 26, 1940 |
| 2,232,556 | Nichols | Feb. 18, 1941 |
| 2,292,571 | Komline | Aug. 11, 1942 |
| 2,343,179 | Hauck | Feb. 29, 1944 |
| 2,389,077 | Peterson | Nov. 13, 1945 |